US011854240B2

United States Patent
Wang et al.

(10) Patent No.: US 11,854,240 B2
(45) Date of Patent: Dec. 26, 2023

(54) VISION BASED TARGET TRACKING THAT DISTINGUISHES FACIAL FEATURE TARGETS

(71) Applicant: DeepNorth Inc., Foster City, CA (US)

(72) Inventors: Jinjun Wang, San Jose, CA (US); Shun Zhang, Xi'an (CN); Rui Shi, Xi'an (CN)

(73) Assignee: DeepNorth Inc., Redwood City, CA (US)

( * ) Notice: Subject to any disclaimer, the term of this patent is extended or adjusted under 35 U.S.C. 154(b) by 74 days.

(21) Appl. No.: 17/122,941

(22) Filed: Dec. 15, 2020

(65) Prior Publication Data

US 2021/0142044 A1 May 13, 2021

Related U.S. Application Data

(62) Division of application No. 15/792,487, filed on Oct. 24, 2017, now Pat. No. 10,902,243.

(60) Provisional application No. 62/412,643, filed on Oct. 25, 2016, provisional application No. 62/412,647, filed on Oct. 25, 2016.

(51) Int. Cl.
| | |
|---|---|
| G06V 10/44 | (2022.01) |
| G06V 40/16 | (2022.01) |
| G06V 10/77 | (2022.01) |
| G06V 10/82 | (2022.01) |
| G06V 30/19 | (2022.01) |
| G06V 10/764 | (2022.01) |
| G06F 18/2411 | (2023.01) |

(52) U.S. Cl.
CPC ........ *G06V 10/454* (2022.01); *G06F 18/2411* (2023.01); *G06V 10/764* (2022.01); *G06V 10/7715* (2022.01); *G06V 10/82* (2022.01); *G06V 30/19173* (2022.01); *G06V 40/161* (2022.01); *G06V 40/169* (2022.01); *G06V 40/172* (2022.01); *G06V 40/173* (2022.01)

(58) Field of Classification Search
CPC .. G06K 9/6244; G06K 9/6269; G06K 9/6271; G06V 10/454; G06V 10/82; G06V 40/161; G06V 40/169; G06V 40/172; G06V 40/173

See application file for complete search history.

(56) References Cited

PUBLICATIONS

Chen et al: "An End-to-End System for Unconstrained Face Verification with Deep Convolutional Neural Networks", ICCV, 2015, (Year: 2015).*

Sun et al, "Deep Learning Face Representation by Joint Identification-Verification", NIPS, 2014 (Year: 2014).*

* cited by examiner

*Primary Examiner* — Ruiping Li
(74) *Attorney, Agent, or Firm* — David R. Stevens; Stevens Law Group

(57) ABSTRACT

A facial recognition method using online sparse learning includes initializing target position and scale, extracting positive and negative samples, and extracting high-dimensional Haar-like features. A sparse coding function can be used to determine sparse Haar-like features and form a sparse feature matrix, and the sparse feature matrix in turn is used to classify targets.

19 Claims, 5 Drawing Sheets

VISION BASED TARGET TRACKING THAT DISTINGUISHES FACIAL FEATURE TARGETS

RELATED APPLICATIONS

This application is a divisional of U.S. application Ser. No. 15/792,487, filed Oct. 24, 2017, which in turn claims the benefit of U.S. Provisional Application Ser. No. 62/412,643, filed Oct. 25, 2016, and U.S. Provisional Application Ser. No. 62/412,647, filed Oct. 25, 2016, which is hereby incorporated herein by reference in its entirety for all purposes.

TECHNICAL FIELD

The present disclosure relates generally to a system capable of tracking persons seen in video surveillance systems. Facial features can be discriminated from a background using a range of techniques including convolutional neural networks trained on external datasets or sparse feature modeling of a face.

BACKGROUND

Face tracking is important for many high-level tasks such as face recognition, emotion recognition, human computer interaction, or security. For example, in security applications, tracking of multiple persons identified by facial feature from one or more security cameras is often needed. Faces must be identified, similar faces distinguished, scale and pose variations accommodated, and face location tracked over time. This can be difficult in complex scene due to the existence of occlusions, clutter, changes in illumination and appearance, motion blur and personal interactions. Typically, available multi-face tracking algorithms often generate short face tracking results, and miss identity switches.

Many existing multi-target face tracking methods use color histogram features, Bhattacharyya coefficient, or correlation coefficient as affinity measures. Alternatively, Haar-like features, SIFT-like features, or oriented gradient histograms have been used. To enhance a face appearance model for tracking, some methods dynamically select the most discriminative features for a specific video. However, all these techniques are generally not tailored toward faces, and are not effective in handling large appearance variations in faces in unconstrained scenarios.

Another issue that prevents widespread use of multiple face tracking systems is based on the inadequacy of the facial appearance model. Visual tracking algorithms can be categorized into generative, discriminative, or hybrid approaches. Generative trackers locate the targets using a maximum-likelihood or maximum-a-posteriori formulation relying only on the target appearance model. These appearance models represent object appearance without considering its discriminative power with respect to the appearance of the background or other targets. Discriminative trackers aim to distinguish the targets from the background using a classifier that learns a decision boundary between the appearance of the target and that of the background or other targets. Hybrid trackers use a combination of the previous two approaches, in which a generative model and a discriminative classifier are combined to capture appearance changes and allow reacquisition of an object after total occlusion. However, all these techniques can be computationally intensive or provide inferior results not suitable for real time multiple person face tracking systems.

SUMMARY

In one described embodiment, a facial recognition system includes a pre-trained neural network and a face pair module connected to the pre-trained neural network. The face pair module can generate positive and negative face pairs without manual intervention. A multiple face tracking module is connected to receive results derived from the face pair module and construct a trajectory model for each identified face of a person.

In some embodiments, the pre-trained neural network is a convolutional neural network that is connected to an external face recognition dataset. In other embodiments a face detection module is used to identify and form face tracklets, and a face tracklet module is used to generate constraints that are provided to the face pair module. A fine-tuning module can be connected between the pre-trained neural network and the multiple face tracking module to adaptively extract discriminative face features.

In one embodiment, the multiple face tracking module uses a pairwise Markov Random Field (MRF) model to construct a trajectory model. Additionally, the multiple face tracking module can use a Loopy Belief Propagation (LBP) algorithm to provide person identities for selected trajectories based on extracted facial features. In still other embodiments a face tracklet module can be used to generate constraints that are provided to the face pair module, with constraints including a finding that faces in a single tracklet are of the same person, and that faces that appear at different positions in the same frame are different persons.

A method for facial recognition can include the steps of providing a face recognition dataset for input into a neural network, and detecting faces and forming face tracklets to determine spatio-temporal constraints. The face tracklet and spatio-temporal constraints are provided to a face pair module connected to the pre-trained neural network, with the face pair module able to automatically generate positive and negative face pairs. A multiple face tracking module is connected to receive results derived from the face pair module and construct a trajectory model for each identified face of a person.

Another embodiment includes a dual neural network (Siamese) architecture for distinguishing faces. First and second neural networks for respectively receiving first and second facial images are prepared, with each neural network sharing the same parameters and initialized with the same pre-trained convolutional neural network. Each network outputs a result to a measurement module that receives the network output from the first and second neural networks and determines a metric distance. A face distinguishing model that determines whether the first and second facial images are the same or different based on the determined metric distance completes the evaluation, which can have a determined metric based on Euclidean distance. A contrastive loss function can be used to ensure that determined metric distances between faces of different persons are greater than determined metric distances between faces of a same person. In some embodiments, first and second facial images can be used to determine spatio-temporal constraints derived from video image frames.

Another described embodiment is a facial recognition method that uses online sparse learning. Steps to practice the method include initializing target position and scale; extracting positive and negative samples; and extracting high-dimensional Haar-like features. A sparse coding function can be used to determined sparse Haar-like features and form a sparse feature matrix; and the sparse feature matrix is used to classify targets. Classification can be done with a naïve Bayesian classifier.

Another embodiment is an adaptive feature updating method to determine a target and a target template using online sparse learning. Steps to practice the method include extracting sparse Haar-like features from candidate face targets; and classifying and scoring results derived from the sparse Haar-like features to locate the target. Target similarity to the target template can then be determined. In some embodiments a naïve Bayesian classifier can be used to determine target similarity to the target template, with the target template replaced with the target selection when the naïve Bayesian classifier finds that the target is not similar to the target template. Alternatively, the naïve Bayesian classifier can be used to determine target similarity to the target template, and the naïve Bayesian classifier is updated when the naïve Bayesian classifier finds that the target is similar to the target template.

DETAILED DESCRIPTION

Figure 1:
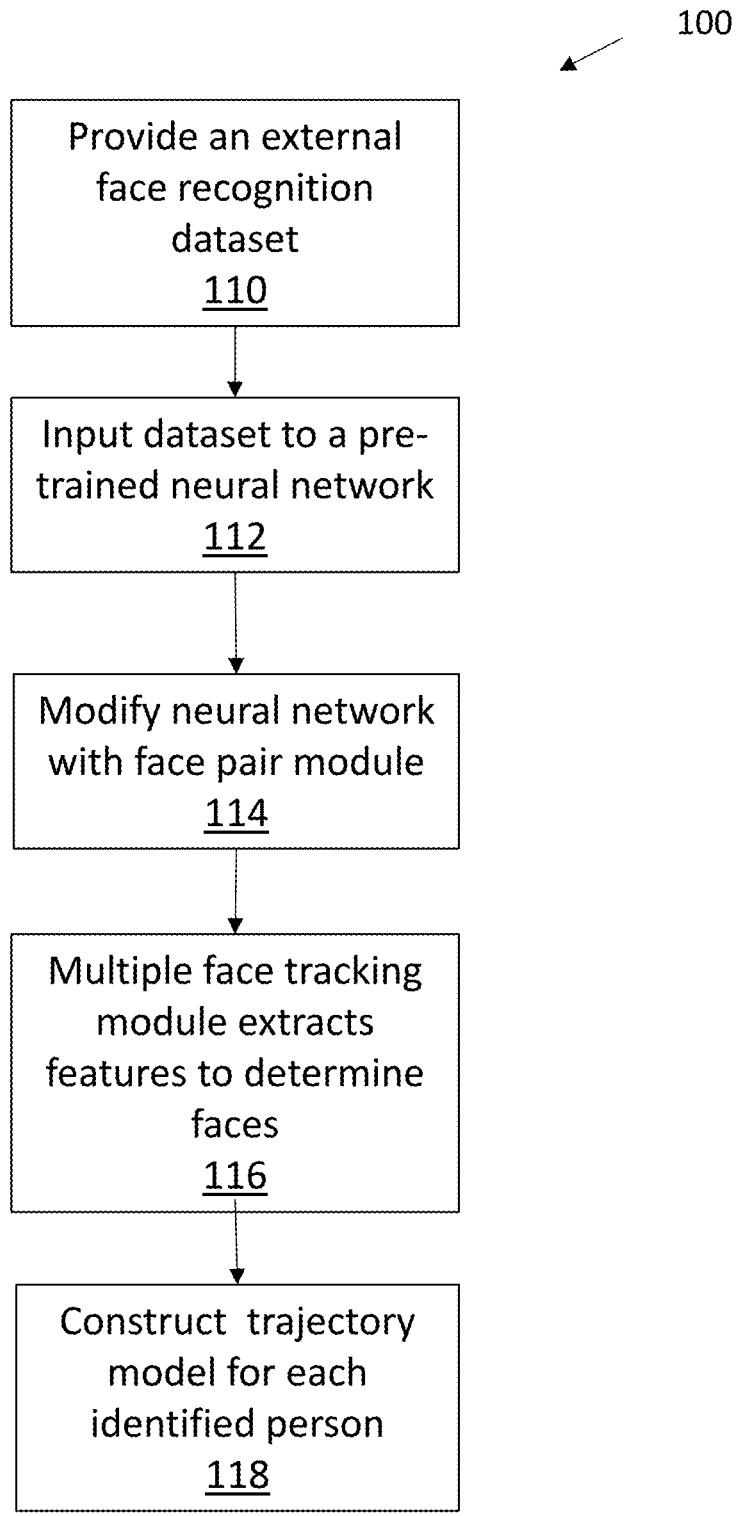
FIG. 1 illustrates a method able to identify and track multiple faces.

FIG. 1 is a cartoon illustrating an effective feature learning method to learn discriminative and adaptive features for faces in a specific video. A facial recognition system and method 100 uses an external face recognition dataset 110 to provide input to a pre-trained neural network 112. A face pair module including positive and negative face pairs is connected to the pre-trained neural network (step 114). A multiple face tracking module is connected to receive results derived from the face pair module (116) and construct a trajectory model for each identified face of a person (step 118).

In some embodiments a convolutional neural network (CNN) can be used as the neural network. Advantageously, raw input video can taken as the input, and detection, tracking, clustering, and feature adaptation in a fully automatic way. In one embodiment, a deep convolutional neural network (CNN) is pre-trained for extracting generic face features on a large-scale external face recognition dataset. The features are fine-tuned to adapt to the appearance changes, pose and scale, or other variations of different faces presented in a particular video. Positive and negative training pairs can be automatically discovered from the face tracklets based on spatial-temporal constraints. The fine-tuned CNN can map face images to a nonlinear embedding space where the distance between the face images directly corresponds to a measure of semantic face similarity. Finally, learned features in a Markov Random Field (MRF) model can be incorporated and the optimal assignment of identities with the maximum a posteriori estimation inferred.

CNNs can be trained on a large-scale face recognition dataset to well classify different identities, resulting in discriminative and compact features with good generalization. For example, in the training stage of one embodiment, each input image is classified into 10,000 identities with 160 hidden identity features in the top layers. The hidden identity features can be well generalized to other tasks (e.g. face verification) and identities outside the training set. Some embodiments can include deep (e.g. greater that five layers) neural networks. In an exemplary embodiment, a nine-layer deep convolutional neural network is trained on a large-scale face recognition dataset to obtain a face representation that generalizes well to other datasets for face verification.

Figure 2:
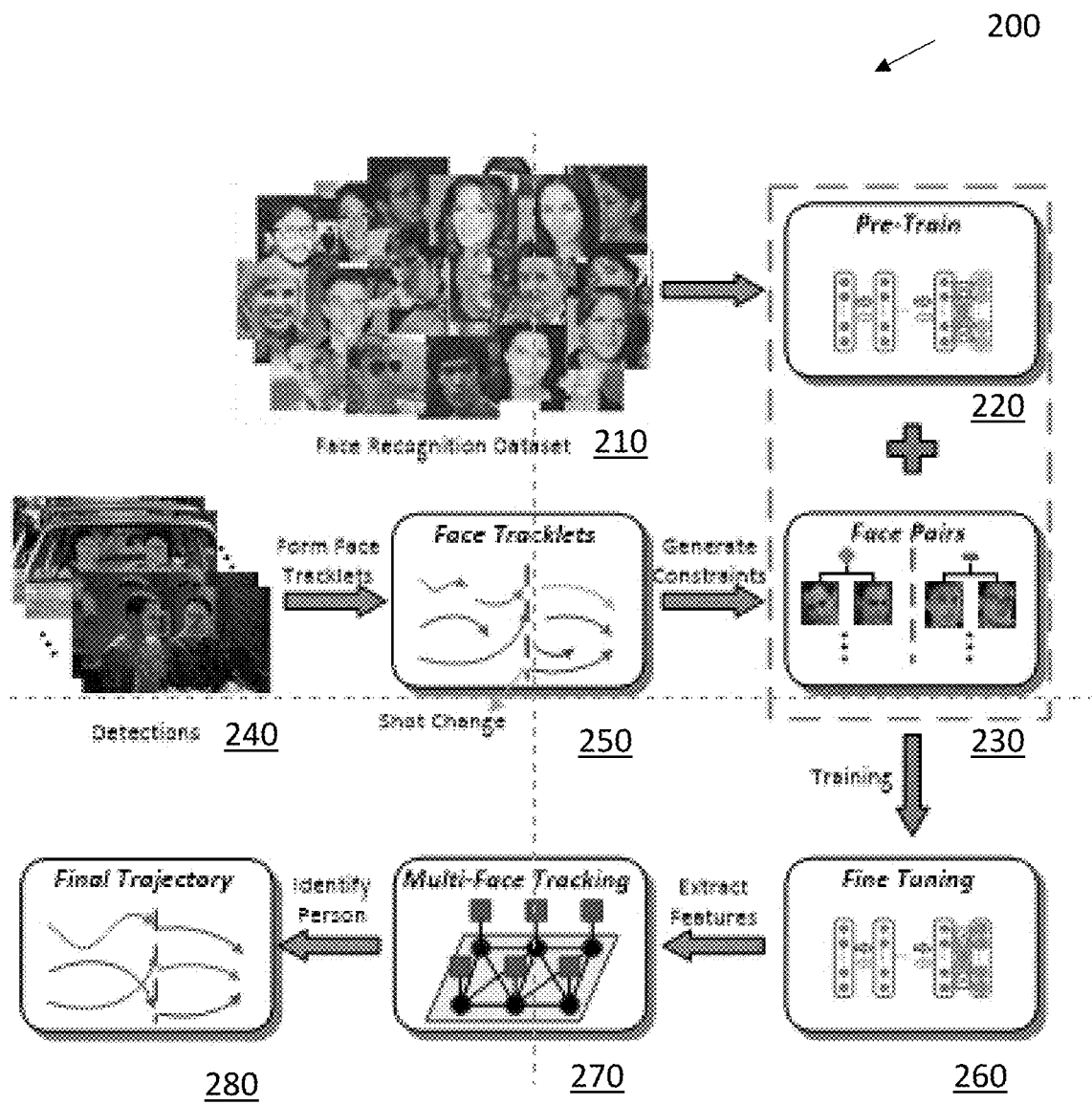
FIG. 2 illustrates a system and method able to identify and track multiple faces using a convolutional neural network (CNN)

As seen in FIG. 2, system and method 200 uses an external face recognition dataset 210 to pre-train a convolutional neural network (CNN) 220 to learn identity-related features for the task of face identification. The CNN can be based on a wide variety of architectures and modules, but can include input processing modules, convolutional layers with a variety of possible learnable filters (kernels), spatial arrangements, parameter sharing schemes. Pooling layers with various non-linear down sampling mechanisms, ReLU layers to increase non-linear properties of decision functions, and one or more fully or partially connected layers can be used in various embodiments.

A face detection module 240 can operate to form face tracklets using module 250. Spatio-temporal constraints can be derived and passed to a face training pair module 230. Results from the pre-trained CNN 220 can be further improved by use this face training pair module 230. Together this allows, without manual labeling in a specific video, adaption to large appearance variation of a same person due to different poses, expressions, scales and lighting across shots. For example, in a given video, shot changes can be detected and used to divide the video into multiple shots. Within each shot, a face detector can be used to generate face detections and link adjacent detections into short tracklets. Visual constraints can be exploited from these face tracklets, and positive and negative training pairs generated. Fine tuning 260 can be based on a Siamese architecture (discussed in more detail with respect to FIG. 3 hereafter) with the generated face pairs for learning a nonlinear metric, such that the similarity of positive face pairs is reduced and that of negative face pairs is enlarged. After extraction of features, a multi-face tracking module 270 is used to assign person identities to tracklets. Using, for example, a pairwise Markov Random Field (MRF) model that nodes denote tracklets, and states that denote person identities, a trajectory model can be constructed for each tracked person. Person identities of all tracklets within one shot can be inferred by loopy belief propagation (LBP) algorithm using motion and appearance cues. Between shots, the identity assignment of tracklets is performed by computing only the appearance similarity between the trajectory model and tracklets. The final trajectory is formed by linking the tracklets with the same identity. In other embodiments, for the tracklets in one shot, linking tracklets can be based on the motion and appearance cues of trajectory models. The tracklets with the same label are linked into short trajectories. To link tracklets across multiple shots, re-identification can be performed by only computing the appearance similarity between tracklets and trajectory models.

In some embodiments, an online unified framework can be used to determine local-to-global trajectory models as a joint optimal assignment. An iterative algorithm can be used to alternately update trajectory models and link tracklets into longer fragments. In one implementation, for example, an iteratively updated tracking system can include a first module for creating an initial trajectory model for multiple targets from a set of received image detections. A second module is connected to the first module and includes a Markov random field model to provide identification of multiple targets. A third module is connected to the second module and includes a loopy belief propagation algorithm to solve a joint object function and maximal condition probability of the Markov random field model. A tracklet module can be connected to the third module. The tracklet module updates the first module trajectory module, and after convergence, outputs a trajectory model for multiple targets. In some embodiments the first module includes sliding windows initializable from at least one of a first frame and a previous sliding window. The second module can find an optimal face target assignment that maximizes the conditional probability of Markov random field modelled face targets, and the third module can find an optimal target assignment that maximizes the conditional probability of Markov random field modelled face targets.

In one example embodiment, given a set of face tracklets, visual constraints based on the spatial-temporal constraints can include faces in the same tracklet that belong to the same person. If two face tracklets have overlapped frames, i.e., they appear at different positions in the same frame, this constrains the faces in the respective tracklets to belong to different persons. Advantageously, this allows generation of a large number of positive/negative face pairs that belong to the either the same or different persons without requiring any manual labeling.

More specifically, let $T_i = x_{i1}, \ldots, x_{in}$ denote the $i^{th}$ track of length $n_i$. a set of positive training pairs $P_u$ by collecting all within-frame face pairs: $P_u = \{(x_{ik}, x_{il})\}$, s.t. $\forall k, l = 1, \ldots, n_i$, $k \neq l$. Similarly, using all pairs of tracks that overlap in some frames, a set of negative training pairs $N_u$ can be generated by collecting all between-track face pairs: $N_u = \{(x_{ik}, x_{jl})\}$, s.t. $\forall k = 1, \ldots, n_i$, $\forall j = 1, \ldots, n_j$.

Figure 3:
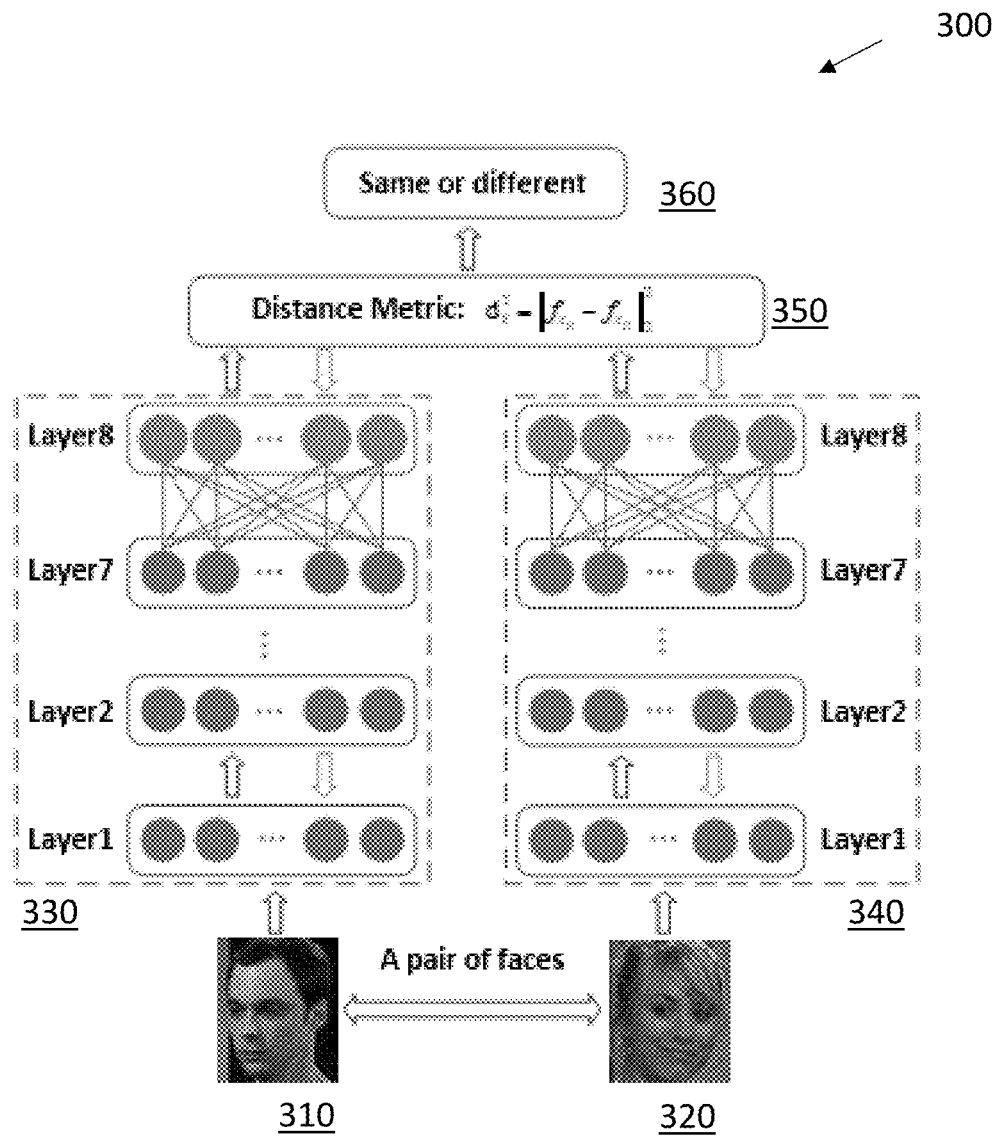
FIG. 3 illustrates paired neural networks for face comparisons.

FIG. 3 illustrates use the pair-based Siamese architecture 300 to learn the adaptive discriminative features from automatically discovered face pairs such as discussed with respect to FIG. 2 above. The Siamese architecture 300 takes image pairs as input (e.g. images 310 and 320) and it includes two substantially identical deep neural networks 330 and 340 with shared architecture and parameters. The networks 330 and 320 can mostly have the same architecture and parameters as a pre-trained CNN, distinguished in that the final output layer is substituted for a feature embedding layer which maps raw face images into a low dimensional target space. In the target space, the distance between face images is small if the images belong to the same person and large otherwise.

More specifically, the face feature extraction process is denoted as $f(x) = Conv(x; \theta_c)$, where $Conv(.)$ is a mapping function, $x \in R^{227 \times 227 \times 3}$ is an input face image, denotes the net parameters to be learned, and $f(x) \in R^d$ denotes the extracted feature vector (d is the dimension of the feature embedding). The CNN can compute the representations of a face pair by passing them to multiple layers of nonlinear transformations.

Denote $x_1$ and $x_2$ as a pair of training images. Let $y_i$ be a binary label of the pair: $y_i = 1$ if the images $x_1$ and $x_2$ belong to the same person, and $y_i = 0$ otherwise. By forward-propagating the two images through the CNN, two feature vectors $f(x_1)$ and $f(x_2)$ can be obtained. In effect, the CNN can be viewed as a nonlinear projection function that maps $x_1$ and $x_2$ into a feature embedding space, and the distance between them can be measured by computing the squared Euclidean distance of the low-dimensional representations, which is defined as: $d_f^2 = \|f(x_1) - f(x_2)\|_2^2$.

To ensure that the distance of two images of the same person is closer to two images of different persons a contrastive loss function can be used as follows:

$$L = \tfrac{1}{2}(y \cdot d_f^2 + (1-y) \cdot \max(0, \tau - d_f^2))$$

where $\tau$ ($\tau = 1$ in our experiments) is the margin. Intuitively, if $x_{i1}$ and $x_{i2}$ are from the same identity, the loss is $\tfrac{1}{2} d_f^2$ and $d_f^2$ is decreased. Otherwise, the loss is $\tfrac{1}{2}(\max(0, \tau - d_f^2))$ and $d_f^2$ is increased until it is less than the margin $\tau$.

Other embodiments suited to enable face tracking based on facial features are also contemplated. For example, an online sparse feature (OSF) selection system and method for modeling a tracking target as distinct from its neighboring background can be used. Such an efficient and robust face tracking method includes extraction of high dimensional features from the target, and reduction to low-dimensional discriminative features by sparse coding. An adaptive feature updating strategy can also be introduced to control the rate for sparse coding. The target search can be formulated as a binary classification.

Advantageously, such an embodiment can include an automatic feature-updating strategy to accommodate significant appearance changes of the target. Typically, high dimensional Haar-like features are extracted as an overcompleted basis set, and the feature selection problem is solved in an efficient L1-regularized sparse-coding process. The selected low-dimensional representation best discriminates the target from its neighboring background. A naive Bayesian classifier can then be used to select the most-likely target candidate by a binary classification process. The online feature selection process happens when there are significant appearance changes identified by a thresholding strategy.

Figure 4:
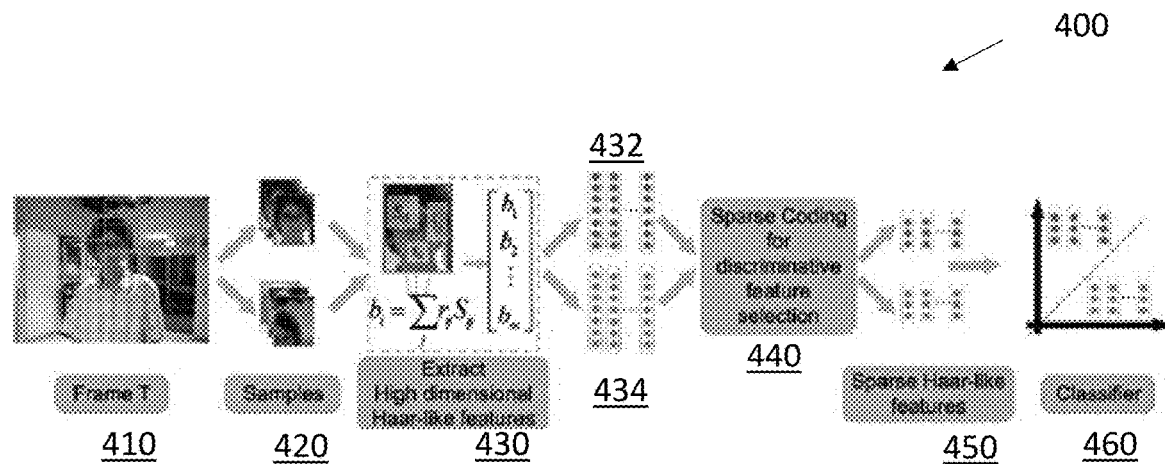
FIG. 4 illustrates methods supporting an online sparse feature selection method.

More specifically, as seen with respect to FIG. 4, an online sparse feature (OSF) selection system 400 can start with a module 410 that provides position and scale of a target, either manually or by a detector, at the first frame (frame T) of a video sequence. The target can be represented with $z_0 \in R^{w \times h}$, where w and h represent the width and height of the target, and the location of $z_0$ with $l(z_0)$. $z_0$ is saved as the initial target template. The target is then modelled with high-dimensional features using of training samples 420 that are automatically extracted from a current frame. A set of samples can be extracted from a small neighborhood around the current target. These samples can include a positive bag 432 defined as: $D^\alpha = \{z | \|l(z) - l_T\| < \alpha\}$ and negative bag 434 extracted from a set of samples far away from the target center and defined as: $D^{\zeta, \beta} = \{z | \zeta < \|l(z) - l_T\| < \beta\}$ with $\alpha < \zeta < \beta$.

High dimensional Haar-like features, denoted as $\vec{B}$, are extractable from these samples to learn the appearance model, where every dimension of the Haar-like feature $b_i \in \vec{B}$ is selected randomly at the first time. Haar-like features can include, but are not limited to, digital images useful in face recognition and having features such as defined adjacent rectangular regions at a specific location in a detection window, Haar-like features have pixel intensities that can be summed in each region and computationally efficient calculation of the difference between these sums can be used to categorize subsections of an image. For example, in most faces the eye region is darker than the cheek region. This allows for use of a common Haar-like feature that is a set of two adjacent rectangles that lie above the eye and the cheek region. Position of these rectangles is defined relative to a detection window that acts like a bounding box to the target object From each of these samples and associated Haar-like features, a high dimensional Haar-like feature vector $\vec{b}_i \in R^m$ can be extracted, along with a corresponding label $y_i \in \{-1, 1\}$ (+1 corresponds to a positive sample and −1 corresponds to a negative sample). The extracted features can be denoted as a matrix $\overline{B}=[b_1, \ldots, b_p]^T \in R^{p \times m}$, in which m is the dimension of the features and p is the number of samples. The corresponding label vector can be denoted as $\vec{Y} \in R^{p \times 1}$. Each element $b_i \in \vec{B}$ is a weighted linear combination of two to four spatially distributed rectangle features at different scales:

$$b_i = \sum_j r_{ij} S_{ij}$$

where $j \in \{2,3,4\}$, $r_{ij} \in R$ is a random number between $[-1, 1]$, and is the sum of pixels to a random rectangle.

While these high dimensional features can preserve adequate appearance information of the target, they do have a high computational cost. Since many features are redundant and compressible, a sparse coding algorithm module 440 can be used to reduce the dimension and permit select only the most discriminative features. Assuming the use of L1 penalty as the sparsity function, this problem can be formulated as an L1-regularized least squares problem. Specifically, the high dimensional features $\vec{B}$ are used as known bases and $\vec{Y}$ as the input vector. Each element $y_i \in \vec{Y}$ is succinctly represented using basis vector $\vec{b}_1, \ldots, \vec{b}_p$; and a sparse vector of weights or "coefficients" $\vec{S} \in R^m$ such that $$y_i \approx \sum_{j=1}^{m} b_j^{(i)} s_j$$

where $s_j \in \vec{S}$ and $b_j^{(i)} \in \vec{b}_i$. With such an assumption, the problem can be modelled as the following convex optimization problem:

$$\text{minimize}_{\vec{S}} = \tfrac{1}{2} \| \vec{Y} - \vec{B}\vec{S} \|^2 + \gamma \| \vec{S} \|$$

which is efficiently by a feature-sign search algorithm.

Since the solution vector $\vec{S}$ contains sparse coefficients, it can be used as a classifier. However, classification may fail when there exist similar objects or occlusions in the scene, because it is unable to utilize the information from the former frames. An incremental naive Bayesian classifier can properly handle this problem. Since each column in $\vec{B}$ denotes the same Haar-like features (extracted in the same way but from different samples), and corresponds to one item in $\vec{S}$, the columns can link non-zero items in $\vec{S}$ to the most discriminative features. This allows deletion of the columns in $\vec{B}$ where the corresponding item in $\vec{S}$ is zero.

The remaining features can be denoted as $\vec{V}(\vec{S}) \in R^{p \times n}$, where n is the dimension of the sparse features. Although the dimension is low, these features are rather salient and can almost reconstruct the original features.

The sparse feature matrix $\vec{V}(\vec{S}) = [\vec{v}_1, \ldots, \vec{v}_p]^T$ generated by module 450 is used for classifier construction and updating in module 460. Assuming every element in $\vec{v}_i \in R^n$ is independently distributed and is Gaussian, they can be modelled with a naïve Bayesian classifier:

$$H(\vec{V}) = \log \left( \frac{\prod_{i=1}^{n} p(v_i \mid y=1) p(y=1)}{\prod_{i=1}^{n} p(v_i \mid y=-1) p(y=-1)} \right) = \sum_{i=1}^{n} \log \left( \frac{p(v_i \mid y=1)}{p(v_i \mid y=-1)} \right)$$

Where the uniform prior i.e., $p(y=1)=p(y=-1)$, and $y \in \{1,-1\}$ is assumed as the sample label. Since every element is Gaussian, the conditional distributions $p(v_i|y=1)$ and $p(v_i|y=-1)$ can be denoted by four parameters $$u_i^1, \sigma_i^1, u_i^0, \sigma_i^0,$$

$$p(v_i|y=1) \square N(u_i^1, \sigma_i^1), p(v_i|y=-1) \square N(u_i^0, \sigma_i^0)$$

where $u_i^1(u_i^0)$ and $\sigma_i^1(\sigma_i^0)$ are mean and standard deviation of the positive (negative) bag, respectively.

The scalar parameter can be incrementally updated by:

$$u_i^1 \leftarrow \lambda u_i^1 + (1-\lambda) u^1$$

and $$\sigma_i^1 \leftarrow \sqrt{\lambda (\sigma_i^1)^2 + (1-\lambda)(\sigma^1)^2 + \lambda(1-\lambda)(u_i^1 - u^1)^2}$$

where $\lambda > 0$ is a learning parameter, $$\sigma^1 = \sqrt{\frac{1}{p} \sum_{k=0|y=1}^{p-1} (v_i(k) - u^1)^2} \text{ and } u^1 = \frac{1}{p} \sum_{k=0|y=1}^{p-1} v_i(k).$$

Parameters $u_i^0, \sigma_i^0$ are updated with similar rules. Since variables are assumed to be independent, the n-dimensional multivariate problem is reduced to the n univariate estimation problem, and thus requires fewer tracking samples to obtain accurate estimation than estimating the covariance matrix in the multivariate estimation. Also, since scheme of positive and negative bags is used, the distribution parameters can be more robustly updated.

Figure 5:
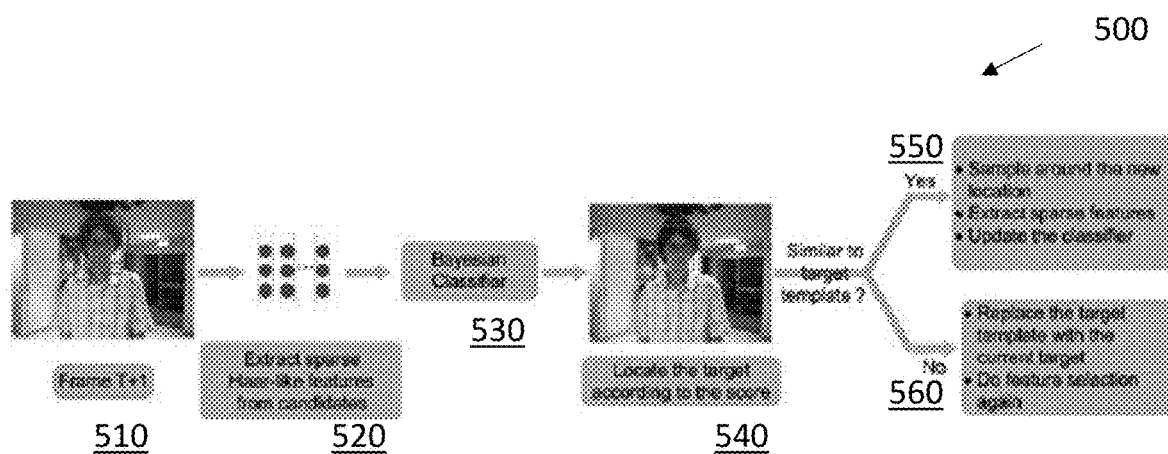
FIG. 5 illustrates feature updating using a sparse similarity measure.

FIG. 5 illustrates one embodiment of a tracking and feature update system and method 500. Since the motion of a target is generally continuous in a video sequence, position of the target in frame T+1 is always close to the position in frame T (module 510). A window search strategy can be adopted that extracts a set of target candidates Z from $D^g = \{z \mid \|l(z) - l_T\| < \delta\}$ in frame T+1, where $\delta$ is the search radius. The sparse feature $v_i \in R^n$ can be directly extracted (module 520) from each of these candidates, and respectively evaluated them with the Bayesian classifier (module 530). This permits tracking to be treated as a binary classification problem, i.e., the candidate with the highest score will be separated from the background (module 540) as the foreground target in the frame T+1, denoted as $z_i \in Z$. If the target is similar to the target template, module 550 provides for sampling around a new location, extracting sparse features, and updating the classifier as part of an adaptive updating procedure. Alternatively, if the target is not similar to the target template, module 560 requires that the target template be replaced with the current target, and feature selection is repeated.

More specifically, this adaptive updating procedure helps determine whether to update the sparse features by using the correlation between the current target $z_1$ and the target template $z_0$, and taking it as a measurement of similarity $$r = \frac{z_1}{\|z_1\|} * \frac{z_0}{\|z_0\|}$$

Higher correlation r indicates higher similarity, and vice versa. The correlation value may vary to image densities. To deal with this, the target is normalized and template provided before computing their correlation. In this way, the correlation value can give a coherent measurement of similarity. If r is higher than a threshold $r_0$, i.e., $z_1$ and $z_0$ are similar enough, it would not be necessary to update the sparse features. Positive and negative bags around the target location $l(z_1)$ can be used to extract the sparse features $\vec{V}(\vec{S})$ to update the parameters of the classifier. However, if r is lower than the threshold, the sparse feature selection process must be redone. Specifically, positive and negative bags are extracted around $l(z_1)$ and high dimensional Haar-like features B are extracted from them. Then, the sparse coding algorithm run again to gain a new sparse coefficients vector $\vec{S}_{new}$, and extract a new set of sparse features $\vec{V}(\vec{S}_{new})$. Also, the target template is replaced with the current target ($z_1 \to z_0$).

Since the parameters of the Bayesian classifier are updated continuously at a learning rate of λ, the information from the former frames is properly utilized. However, when the correlation r is low and the sparse features are replaced with new ones, retraining of the parameters is required for the new classifier. In order to utilize the former information, a feature window which contains some of the positive and negative high-dimensional Haar-like features from several former frames is used to retrain the new classifier whenever sparse coding is carried out.

Figure 6:
FIG. 6 illustrates a range of tracking results.

Evaluation of the foregoing described online sparse feature (OSF) method and system was conducted on eight challenging public datasets: David indoor, Girl, Twinnings, Occluded face, Tiger1, Tiger2, Cliffbar, and Sylvester. These sequences cover most challenging situations in object tracking: heavy occlusion, motion blur, in-plane and out-of-plane rotation, large illumination change, scale variation and complex background. The OSF tracking method and system was then tested against nine state-of-the-art methods. Each tracking task has been initialized by manually marking the target object in the first frame. Tracking has been applied to sequences consisting of 4717 frames. All experiments are performed with a MATLAB implementation on a common PC with an Intel Core i7, 3.40 GHz CPU and 16 GB RAM, where 22.4 fps tracking speed is achieved on average. Some visual results 600 of the eight datasets are displayed in FIG. 6 where:

a. illustrates tracking results on sequence David indoor with illumination change, size change, and appearance change;
b. illustrates tracking results on sequence Girl with rotations, pose change, and heavy occlusion;
c. illustrates tracking results on sequence Cliffbar with complex background, motion blur and rotations;
d. illustrates tracking results on sequence Tiger with heavy occlusions and pose change;
e. illustrates tracking results on sequence Tiger 2 with fast motion and pose change;
f. illustrates tracking results on sequence Occluded face with heavy occlusions;
g. illustrates tracking results on sequence Sylvester with drastic illuminance and pose change; and
h. illustrates tracking results on sequence Twinnings with rotations and size change.

The OSF system and method and nine other approaches were evaluated with two evaluation metrics: center location error and success rate. Success rate is defined as, $$\text{score} = \frac{\text{area}(ROI_T \cap ROI_G)}{\text{area}(ROI_T \cup ROI_G)}$$

where $ROI_T$ is the bounding box of tracking and $ROI_G$ is the bounding box of ground truth. A tracking result is considered success only when score N 0.5. Center location error (CLE) is defined as the Euclidean distance between the central locations of the bounding box of tracking and the bounding box of ground truth. Tables 1 and 2 below show the comparison results of success rate and center location error respectively. Table 1 shows an achieved 100% success rate on David indoor, Occluded face, Cliffbar and Sylvester. None of the other 9 approaches have achieved 100% accuracy on these sequences. Also, the success rate on Girl, Twinnings, Tiger1 and Tiger2 is all above 90%. Table 2 shows that the CLE of our approach is the best on David indoor, Occluded face, Tiger1, Tiger2, Cliffbar and Sylvester, and is the third best on Girl and Twinnings. It is observed that the performance of the proposed method (OSF) is overall superior to the other nine state-of-the-art methods.

TABLE 1

Success rate (%), the higher the better. Bold font indicates the best performance.

| Video clip | OSF | FCT | CT | MIL | OAB | semiB | Frag | $L_1$-track | TLD | Struck |
|---|---|---|---|---|---|---|---|---|---|---|
| David indoor | 100 | 98 | 89 | 68 | 31 | 46 | 8 | 41 | 98 | 98 |
| Girl | 97 | 31 | 78 | 50 | 71 | 50 | 68 | 90 | 57 | 99 |
| Twinnings | 98 | 98 | 89 | 72 | 98 | 23 | 69 | 83 | 46 | 98 |
| Occluded face | 100 | 99 | 89 | 97 | 49 | 41 | 54 | 96 | 87 | 97 |
| Tiger1 | 93 | 52 | 78 | 39 | 24 | 28 | 19 | 13 | 65 | 73 |
| Tiger2 | 95 | 72 | 60 | 45 | 37 | 17 | 13 | 12 | 41 | 22 |
| Cliffbar | 100 | 99 | 89 | 65 | 23 | 65 | 22 | 38 | 67 | 70 |
| Sylvester | 100 | 77 | 75 | 80 | 70 | 68 | 34 | 46 | 94 | 87 |

TABLE 2

Center location error (in pixels), the lower the better. Bold font indicates the best performance.

| Video clip | OSF | FCT | CT | MIL | OAB | semiB | Frag | $L_1$-track | TLD | Struck |
|---|---|---|---|---|---|---|---|---|---|---|
| David indoor | 7 | 11 | 16 | 19 | 57 | 37 | 73 | 42 | 12 | 9 |
| Girl | 16 | 40 | 21 | 25 | 23 | 50 | 26 | 13 | — | 10 |
| Twinnings | 9 | 10 | 9 | 14 | 7 | 70 | 15 | 10 | 15 | 7 |
| Occluded face | 12 | 12 | 19 | 17 | 36 | 39 | 57 | 17 | 24 | 12 |
| Tiger1 | 6 | 23 | 10 | 27 | 42 | 39 | 39 | 48 | 24 | 12 |
| Tiger2 | 6 | 10 | 13 | 18 | 22 | 29 | 37 | 57 | 40 | 22 |
| Cliffbar | 5 | 6 | 7 | 14 | 33 | 56 | 34 | 35 | 70 | 20 |
| Sylvester | 6 | 9 | 9 | 10 | 12 | 14 | 47 | 42 | 7 | 9 |

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A facial recognition method comprising:
initializing target position and scale within a video frame;
extracting positive and negative face pair samples from candidate face targets in the video frame;
extracting higher-dimensional multi-pixel Haar-like facial features, including pixel intensities, from the positive and negative face pair samples;
using a sparse coding function reducing dimension of the higher-dimensional multi-pixel Haar-like facial features, including:
selecting a sub-set of more discriminative Haar-like facial features from among the higher-dimensional multi-pixel Haar-like facial features; and
forming a sparse feature matrix from the sub-set of more discriminative Haar-like facial features, including:
forming columns linking non-zero items in a solution vector to the sub-set of more discriminative Haar-like facial features; and
deleting columns where the corresponding item in the solution vector is zero; and
classifying targets based on content of the sparse feature matrix.

2. The facial recognition method of claim 1, wherein classifying targets comprises classifying targets using a naive Bayesian classifier.

3. The facial recognition method of claim 1, wherein classifying targets comprises:

classifying and scoring results derived from the sub-set of more discriminative Haar-like features to locate a target, from among candidate face targets, in the video frame; and
determining similarity of the target to a target template.

4. The facial recognition method of claim 3, wherein determining similarity of the target to a target template comprising determining similarity of the target to the target template using a naive Bayesian classifier.

5. The facial recognition method of claim 3, further comprising:
determining that the target is dissimilar to the target template; and
replacing the target template with the target based on the determined dissimilarity.

6. The facial recognition method of claim 3, further comprising:
determining that the target is similar to the target template; and
updating a Bayesian classifier based on the determined similarity.

7. The facial recognition method of claim 3, further comprising accessing the video frame; and
wherein extracting higher-dimensional multi-pixel Haar-like features comprises extracting higher-dimensional multi-pixel Haar-like features from candidate face targets in the video frame.

8. The facial recognition method of claim 3, wherein classifying and scoring results derived from the sub-subset or more discriminative Haar-like features comprises classifying the results using a binary classification process.

9. The facial recognition method of claim 1, further comprising accessing the video frame; and
wherein classifying targets comprises locating a target in the video frame based on content in the sparse feature matrix.

10. The facial recognition method of claim 1, wherein extracting positive and negative face pair samples from the candidate face targets in the video frame comprises extracting the positive and negative samples in a neighborhood around candidate face target positions within the video frame.

11. The facial recognition method of claim 1, wherein extracting higher-dimensional multi-pixel Haar-like features comprises:
detecting an eye region and a cheek region of a candidate face target at a target position; and
determining a multi-pixel Haar-like feature that includes adjacent triangles above the eye region and the check region within the video frame.

12. A computer system comprising:
a processor;
system memory coupled to the processor and storing instructions configured to cause the processor to:
initialize target position and scale within a video frame;
extract positive and negative face pair samples from candidate face targets in the video frame;
extract higher-dimensional multi-pixel Haar-like facial features, including pixel intensities, from the positive and negative face pair samples;
use a sparse coding function reducing dimension of the higher-dimensional multi-pixel Haar-like facial features, including:
selecting a sub-set of more discriminative Haar-like facial features from among the higher-dimensional multi-pixel Haar-like features; and form a sparse feature matrix from the sub-set of more discriminative Haar-like facial features, including:
  form columns linking non-zero items in a solution vector to the sub-set of more discriminative Haar-like facial features; and
  delete columns where the corresponding item in the solution vector is zero; and
classify targets based on content of the sparse feature matrix.

13. The computer system of claim 12, further comprising instructions configured to access the video frame; and
  wherein instructions configured to classify targets comprise instructions configured to locate a target in the video frame based on content in the sparse feature matrix.

14. The computer system of claim 12, wherein instructions configured to extract positive and negative face pair samples from candidate face targets in the video frame comprise instructions configured to extract the positive and negative face pair samples in a neighborhood around candidate face target positions within the video frame.

15. The computer system of claim 12, wherein instructions configured to extract higher-dimensional multi-pixel Haar-like features comprise instructions configured to:
  detect an eye region and a cheek region of a candidate face target at a target position; and
  determine a multi-pixel Haar-like feature that includes adjacent triangles above the eye region and the check region within the video frame.

16. The computer system of claim 12, wherein instructions configured to classify targets comprise instructions configured to:
  classify and score results derived from the sub-set of more discriminative Haar-like features to locate a target, from among candidate face targets, in the video frame; and
  determine similarity of the target to a target template.

17. The computer system of claim 16, further comprising instructions configured to:
  determine that the target is dissimilar to the target template; and
  replace the target template with the target based on the determined dissimilarity.

18. The computer system of claim 16, further comprising instructions configured to:
  determine that the target is similar to the target template; and
  updating a Bayesian classifier based on the determined similarity.

19. The computer system of claim 16, wherein instructions configured to classify and score results derived from the sub-set of more discriminative Haar-like features comprise instructions configured to classify the results using a binary classification process.

* * * * *